Patented Oct. 24, 1922.

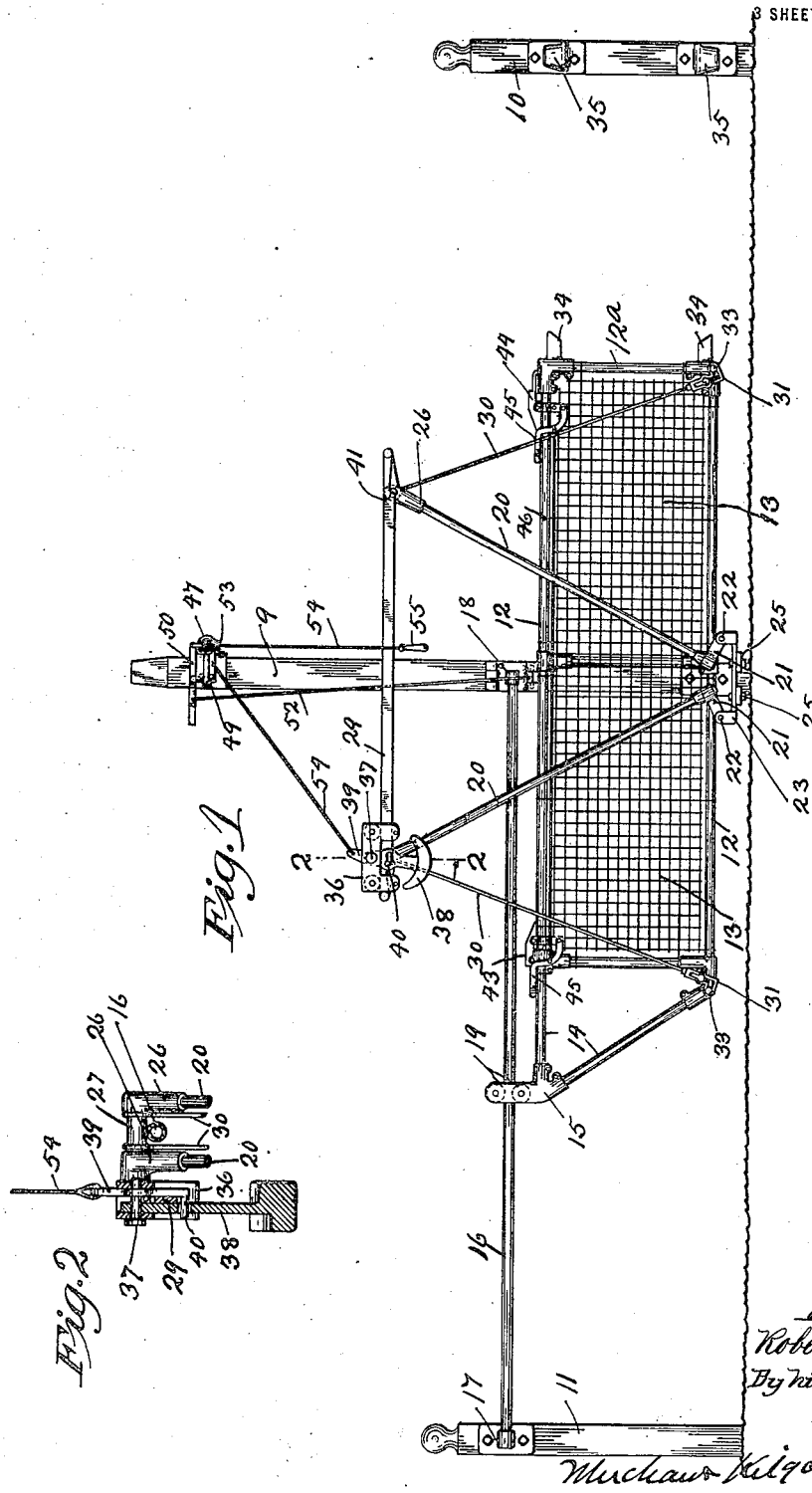

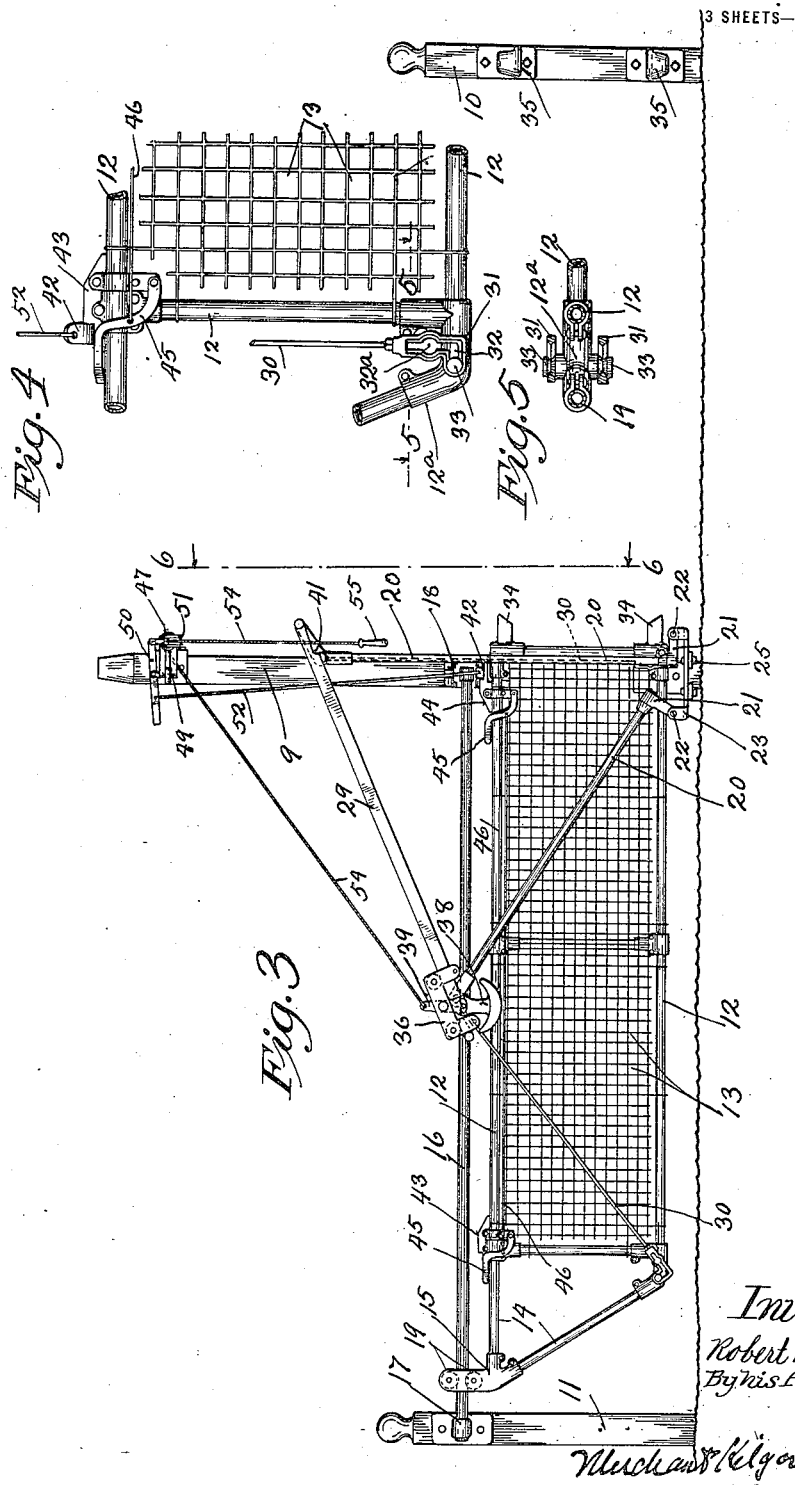

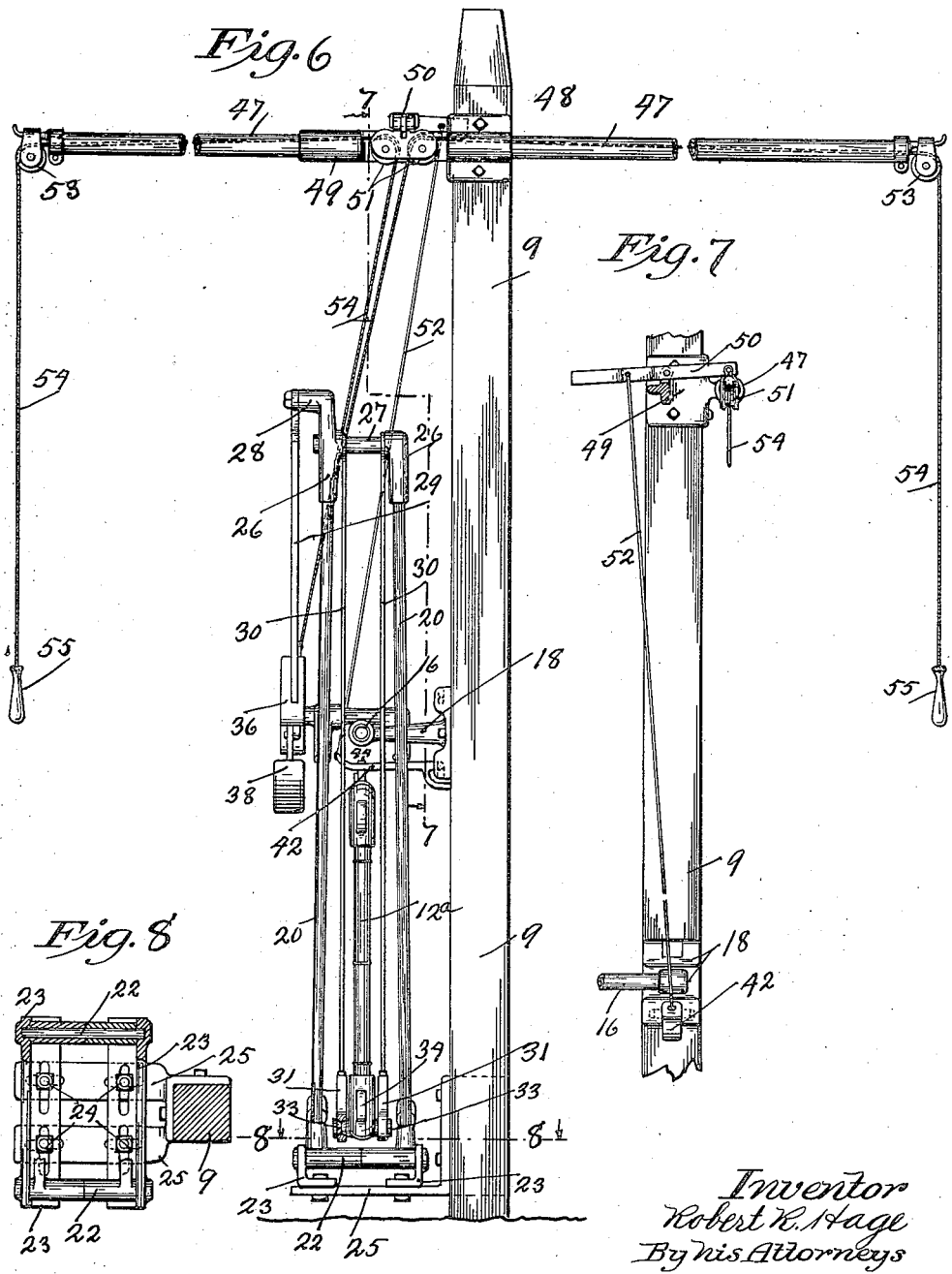

1,432,750

UNITED STATES PATENT OFFICE.

ROBERT R. HAGE, OF MINNEAPOLIS, MINNESOTA, ASSIGNOR OF ONE-HALF TO OSCAR R. HAGE, OF MINNEAPOLIS, MINNESOTA.

GATE-ACTUATING MECHANISM.

Application filed January 19, 1921. Serial No. 438,364.

*To all whom it may concern:*

Be it known that I, ROBERT R. HAGE, am a citizen of the United States, residing at Minneapolis, in the county of Hennepin and State of Minnesota, have invented certain new and useful Improvements in Gate-Actuating Mechanism; and I do hereby declare the following to be a full, clear, and exact description of the invention, such as will enable others skilled in the art to which it appertains to make and use the same.

My present invention relates to gate actuating mechanism and is in the nature of an improvement on or modification of the gate disclosed and claimed in my prior patents, one of date January 5, 1909, #908,563, and the other of date February 6, 1917, #1,214,913. In the gates of the prior patents, the oscillating gate support is of such arrangement that the gates would be given rising and falling movements when moved from open to closed positions and conversely. The present invention provides an improved arrangement of the gate support whereby the gate is given an approximately true horizontal movement, neither rising nor falling perceptibly when moved to open or closed position or conversely.

The present invention is illustrated in the accompanying drawings, wherein like characters indicate like parts throughout the several views.

Referring to the drawings:

Fig. 1 is a side elevation showing the improved gate and gate actuating mechanism, the gate being in an intermediate position;

Fig. 2 is a detail in section on the line 2—2 of Fig. 1;

Fig. 3 is a view corresponding to Fig. 1, but showing the gate in an open position;

Fig. 4 is a fragmentary elevation showing the inner end of the gate and certain parts thereon;

Fig. 5 is a horizontal section on the line 5—5 of Fig. 4;

Fig. 6 is an elevation looking from the right toward the left from the line marked 6—6 on Fig. 3, the parts being shown on a larger scale than in Fig. 3;

Fig. 7 is a fragmentary section on the irregular line 7—7 of Fig. 6; and

Fig. 8 is a horizontal section on the line 8—8 of Fig. 6.

For co-operation with the gate, I provide a long or high post 9, and on opposite sides of said post 9, relatively short posts 10 and 11. The gateway is between the posts 9 and 10 and the post 11 is along or in the fence structure, not shown.

The gate, as shown, comprises a rectangular marginal frame 12 and wire filler or net work 13. At its inner end, the gate frame 12 has a bracket-like extension 14 equipped with a coupling head 15 that is bifurcated and embraces a straight horizontal guide rod 16. The guide rod 16, at one end, is secured to a bracket 17 on the post 11 and, at its other end, is secured to a bracket 18 on the post 9. The coupling head 15 is equipped with upper and lower rollers 19 that work, one on and the other under the guide rod 16.

The oscillatory gate support, in this improved arrangement, comprises upwardly diverging rocker bars 20 arranged in duplicates on opposite sides of the gate. At their lower ends, the rocker bars 20 have rigidly secured metal feet 21 that project in opposite directions and, at their toes or outer ends, are pivoted at 22 to bearing strips 23, which as shown, are adjustably secured by slot and bolt connections 24 to a bracket 25, which, in turn, is rigidly secured to the post 9 close to the ground, (see particularly Figs. 6 and 8). At their upper ends, the rocker bars 20 are provided with metallic heads 26 that are connected in pairs by short coupling shafts 27, (see particularly Fig. 6). The heads 26, on one side of the gate, have extended arms 28 in which the ends of a tie bar 29 are pivotally connected.

The gate 13 is hung on downwardly diverging links 30 that are arranged in pairs on opposite sides of the gate. These links 30, at their upper ends, are pivoted on the connecting shafts 27, and at their lower ends, they are pivotally connected to the lower end portions of the gate 13, preferably by means of coupling brackets 31. The coupling brackets 31 have L-shaped slots 32 for engagement with headed studs 33 on coupling brackets 12ª of the gate frame 12, (see particularly Figs. 4 and 5). The L-shaped slots 32 have enlarged portions 32ª, through which the heads of the studs 33 may be passed, therefore making it an easy matter to connect the supporting links 30 to the gate or to disconnect the same therefrom. The gate is thus mounted to move on a straight horizontal line with its lower edge just above the pivots 22.

At its front or outer end, the gate 12 is provided with outstanding lugs 34 that will engage the pockets 35 on the post 10, when the gate is in a closed position. The engagement of the lugs 34 with the pockets 35 holds the closed gate against lateral movements at its extended end.

A carriage or weighted traveller 36 is arranged to move freely on the tie bar 29, under the action of gravity when said bar 29 is moved from a position inclined in one direction to a position inclined in an opposite direction. This carriage is preferably roller-equipped to reduce the friction between the same and the bar 29. Pivoted to the carriage 36, by a pin 37, (see Figs. 2 and 3), is a so-called tripping pendulum or gravity-held lever 38. Intermediately pivoted on the pin 37 is a lock lever 39, the lower end 40 of which is offset under the bar 29 and is projected into an elongated perforation formed in the pendulum 38. Near its ends, the bar 29, on its under side, is formed with reversely acting lock shoulders 41 with which the end 40 of the lock lever 39 will be held in engagement by the pendulum 37, thereby holding the carriage 36 locked to the lower end of said bar 29.

For locking the gate in a closed position, a lock piece 42, (see Figs. 6 and 7), is pivoted to the base of the bracket 18 and its free end projects over the top of the gate. When the gate is in closed position, (see Fig. 4), the lock lever 42 will engage the shoulder of a lock plate 43 secured on the upper bar of the gate frame 12, and when the gate is in an open position, said lock lever will likewise engage with a similar lock plate 44 on the upper bar of said gate frame, (see Fig. 3). The lock plates 43 and 44, on their inner edges, are beveled so that, under movements of the gate to extreme positions, they will cam themselves into engagement with the lock lever 42. Of course, the lock lever 42 may be lifted out of engagement with the lock plates by directly engaging the same with the finger or hand, but for making this release an easy matter when the gate is used as a field gate, I preferably provide the hand-operated lock-releasing device shown in Figs. 1, 2 and 4. This lock-releasing device, as shown, comprises two curved levers 45 pivotally connected to the gate frame and connected for common movements by a tie rod 46. When the gate is in a closed position, the left-hand or inner lever 45, at its free upper end, will stand immediately under the free end of the lock lever 42. Hence, a person standing near the post 10 may release the lock of the closed gate without the necessity of going within reach of said lock lever, simply by lifting the free end of the right-hand or outer lever 45 and thereby simultaneously raising the left-hand or inner lever 45 and causing the latter to directly lift and release said lock lever 42. When the gate is used as a field gate, it may be moved from one position to another by hand power applied directly thereto.

When the gate is in its open position, as shown in Fig. 3, the right-hand rocker bars 18 and the right-hand links 30 will stand in vertical positions, and the left-hand rocker bars 18 and links 30 will have their maximum inclination but will be at equal but reverse angles to a horizontal line. When the gate is in the closed position, a reverse condition will prevail, that is, the left-hand rocker bars 18 and links 30 will be in vertical positions, and the right-hand rocker bars 18 and links 30 will have their maximum inclination and will be at equal but opposite angles to a horizontal line. Throughout the movements of the gate from one extreme position to the other, the right-hand rocker bars 18 and links 30 will maintain equal but reverse angles to a horizontal line and the left-hand rocker bars 18 and links 30 will also maintain equal but reverse angles to a horizontal line. Hence, under movements of the gate, the right-hand links 30 offset rising and falling movements of the right-hand rocker bars 18 and left-hand links offset rising and falling movements of the left-hand rocker bars. It therefore follows that the gate will be given a true horizontal movement and will neither rise nor fall as it is moved from open to closed position or conversely.

For operating the gate from a vehicle approaching the gate in either direction, I preferably provide the following devices:

The numeral 47 indicates a long horizontal cross bar rigidly secured at its intermediate portion to the upper end of the post 9 by a clamping plate 48. This cross bar 47 is preferably a steel or rod iron pipe made in sections and connected by a coupling bracket 49, through which latter a lever 50 is intermediately pivoted. A pair of guide sheaves 51 is journaled to and suspended from one end of the lever 50, and the other end of said lever 50 is connected by a rod 52 to the free end of the lock lever 42, (see Figs. 1, 3, 6 and 7). Mounted at the outer ends of the tubular arm 47 are guide sheaves 53. The numeral 54 indicates gate actuating cables that are passed through the tubular arm 47 and over the guide sheaves 51 and 53. The inner ends of these two cables 54 are attached to the free upper end of the lock lever 39, and to the free depending outer ends of said cables are attached handles 55 adapted to be engaged by a person in a vehicle approaching the gate from either side.

Operation.

The operation of the gate by the use of the cables is substantially as follows:

A person in the approaching vehicle reaches one of the cable handles 55 and pulls down thereon. The first effect of this is to pull the sheave-equipped end of the lever 50 downward and thereby cause the rod 52 to lift the lock lever 42 into a gate-releasing position. Continued pull on the cable operating on the lock lever 39 forces the end 40 of the latter into firmer interlocked engagement with the shoulder 41 of the bar 29 so that the force applied by the cable will lock the gate-supporting arms 18 toward intermediate positions, thereby carrying the gate toward its intermediate or central position, and if this movement be produced quite rapidly, the gate supports and the gate will be carried past their central positions by momentum. When the gate and the supporting connections are moved past their central positions, they will complete their movements under the action of gravity. In moving the gate from one position to the other, the bar 29 will be carried from an oblique position in one direction into an oblique position in the opposite direction, and as soon as the tension on the cable is released, the pendulum 37 will force the end 40 of the lever 39 out of engagement with the shoulder 41 of the bar 29 and the carriage 36, with the lever 39 and pendulum 37, will then, by gravity, be caused to run to the lower end of the bar 29. When the carriage thus runs to the lower end of the bar 29, the pendulum 37 will cause the end 40 of the lever 39 to interlock with the shoulder 41 at the lower end of the bar 29 and the gate-supporting and operating connections are then set for reverse action. Hence, as is evident, the gate may be opened by pulling one cable on approaching the gate and may then be closed by pulling the other cable after passing through the gateway. With the improved gate-supporting connections described, the guide bar 16, which affords the gate and holds the same against lateral movement, not only may but should be a straight bar or rod. The advantage of the gate mounted and operated as described must be obvious from the foregoing statements.

What I claim is:

1. The combination with a gate, of a gate support comprising upwardly diverging rocker bars pivoted at their lower ends at different points spaced in the direction of the travel of the gate, a tie bar pivotally connecting the upper ends of said rocker bars, links pivotally hung from the upper ends of said rocker bars and pivotally connected to said gate at their lower ends, the said rocker bars and links to which they are connected being movable to and from approximately vertical positions in alternate order.

2. The combination with a gate, of a gate support comprising upwardly diverging rocker bars pivoted at their lower ends at different points spaced in the direction of the travel of the gate, a tie bar pivotally connecting the upper ends of said rocker bars, links pivotally hung from the upper ends of said rocker bars and pivotally connected to said gate at their lower ends, the said rocker bars and links to which they are connected being movable to and from approximately vertical positions in alternate order, the gate-actuating device comprising cable guides, and a cable having connections to said gate support for oscillating the same to move the gate to and from closing position.

3. The combination with a gate, of a gate support comprising upwardly diverging rocker bars pivoted at their lower ends at different points spaced in the direction of the travel of the gate, a tie bar pivotally connecting the upper ends of said rocker bars, links pivotally hung from the upper ends of said rocker bars and pivotally connected to said gate at their lower ends, the said rocker bars and links to which they are connected being movable to and from approximately vertical positions in alternate order, and a carriage movable on said tie bar under the action of gravity.

4. The combination with a gate, of a gate support comprising upwardly diverging rocker bars pivoted at their lower ends at different points spaced in the direction of the travel of the gate, a tie bar pivotally connecting the upper ends of said rocker bars, links pivotally hung from the upper ends of said rocker bars and pivotally connected to said gate at their lower ends, the said rocker bars and links to which they are connected being movable to and from approximately vertical positions in alternate order, a carriage movable on said tie bar under the action of gravity, said carriage having a lock for temporarily securing the same to the lower end of said tie bar, and a gate-actuating connection including cable guides and a cable connected to the lock on said carriage and operative throughout the same to lock said tie bar and rocker bars to move the gate from one extreme position to another.

5. The combination with a gate, of a gate support comprising upwardly diverging rocker bars pivoted at their lower ends at different points spaced in the direction of the travel of the gate, a tie bar pivotally connecting the upper ends of said rocker bars, links pivotally hung from the upper ends of said rocker bars and pivotally connected to said gate at their lower ends, the said rocker bars and links to which they are connected being movable to and from approximately vertical positions in alternate order, a gate lock operative to secure the gate in a closed position, and a gate actuating connection operative first to release said gate lock and then to move said gate from one extreme position toward its other extreme position.

In testimony whereof I affix my signature.

ROBERT R. HAGE.